(12) United States Patent
Sakai et al.

(10) Patent No.: US 8,569,921 B2
(45) Date of Patent: Oct. 29, 2013

(54) PERMANENT-MAGNET TYPE ELECTRIC ROTATING MACHINE

(75) Inventors: Kazuto Sakai, Yokosuka (JP); Yutaka Hashiba, Yokosuka (JP); Norio Takahashi, Yokohama (JP); Kazuaki Yuuki, Tokorozawa (JP); Makoto Matsushita, Fuchu (JP); Daisuke Misu, Tama (JP); Masanori Arata, Yokohama (JP); Tadashi Tokumasu, Tokyo (JP); Motoyasu Mochizuki, Tokyo (JP); Kuniyuki Araki, Ageo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 64 days.

(21) Appl. No.: 13/403,666

(22) Filed: Feb. 23, 2012

(65) Prior Publication Data
US 2012/0217833 A1    Aug. 30, 2012

(30) Foreign Application Priority Data

Feb. 24, 2011   (JP) ................................. 2011-038860

(51) Int. Cl.
*H02K 21/12*   (2006.01)
(52) U.S. Cl.
USPC ..................................................... 310/156.43
(58) Field of Classification Search
USPC .................. 310/156.01–156.84, 103, 191
See application file for complete search history.

(56) References Cited

U.S. PATENT DOCUMENTS

| 7,057,323 | B2 * | 6/2006 | Horst .............................. 310/191 |
| 8,030,817 | B2 | 10/2011 | Sakai et al. |
| 2004/0021390 | A1 * | 2/2004 | Kim et al. ...................... 310/191 |
| 2007/0090699 | A1 * | 4/2007 | Ohnishi et al. .............. 310/49 R |
| 2007/0252468 | A1 * | 11/2007 | Lee ........................... 310/156.53 |

FOREIGN PATENT DOCUMENTS

| JP | 2008-048514 A | 2/2008 |
| JP | 2008-289300 A | 11/2008 |

OTHER PUBLICATIONS

Principle and Basic Characteristics of a Hybrid Variable-Magnetic-Force Motor; Kazuto Sakai, et al.; 2010 Annual Conference of I.E.E. of Japan Industry Applications Society JIASC Mar. 7, 2010 (English abstract provided).

* cited by examiner

*Primary Examiner* — Nguyen N Hanh
(74) *Attorney, Agent, or Firm* — Holtz, Holtz Goodman & Chick, PC

(57) ABSTRACT

According to one embodiment, a permanent-magnet type electric rotating machine has a stator, a magnetizing coil, a rotor and a case. The stator has an armature coil configured to form a magnetic circuit for driving. The magnetizing coil is configured to form a magnetic circuit for magnetizing. The rotor has a constant magnetized magnet, a rotor core and a variable magnetized magnet. The rotor core holds the constant magnetized magnet. The constant magnetized magnet is arranged closer to the magnetic circuit for driving than the variable magnetized magnet. The variable magnetized magnet is arranged closer to the magnetic circuit for magnetizing than the constant magnetized magnet.

6 Claims, 7 Drawing Sheets

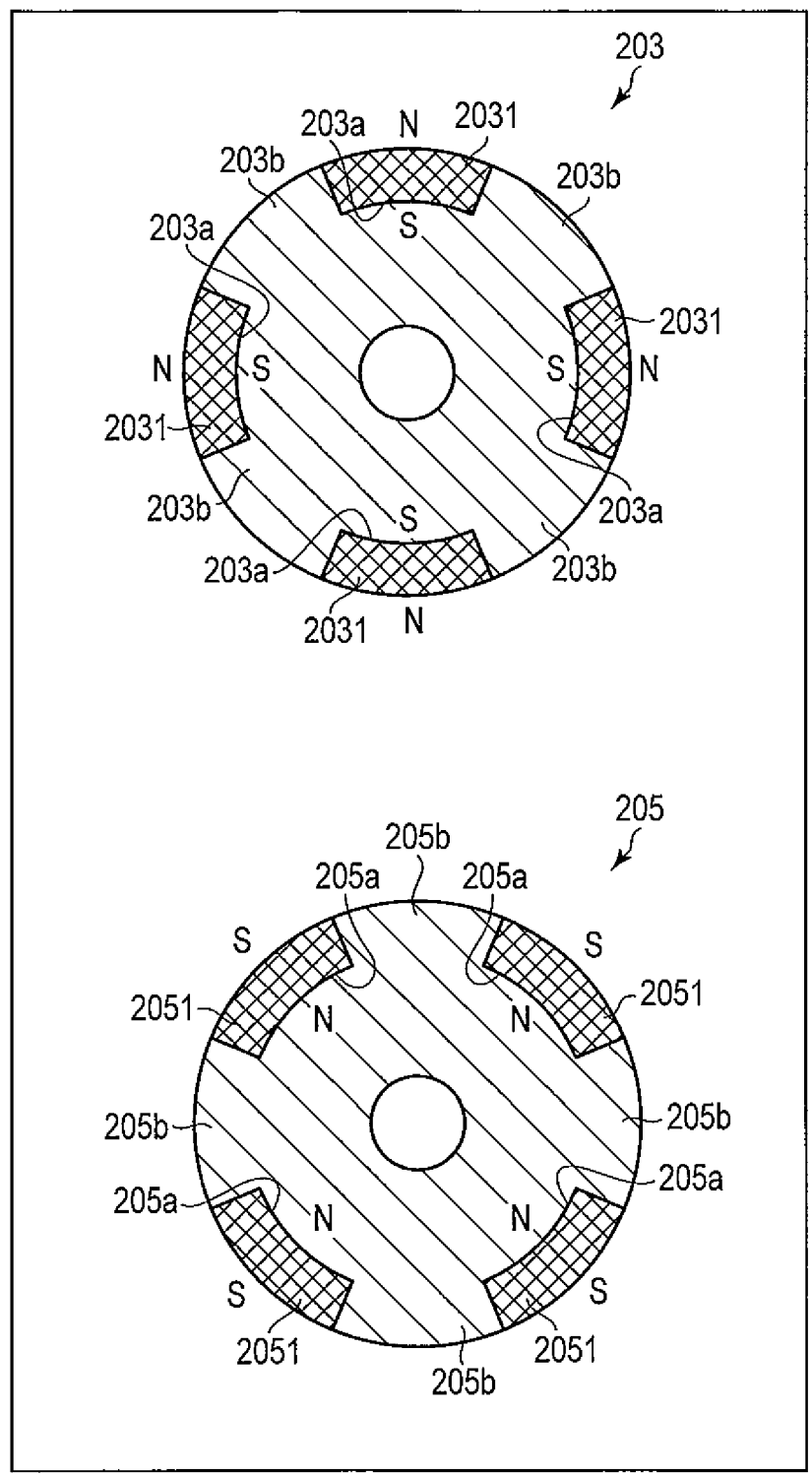
F I G. 3

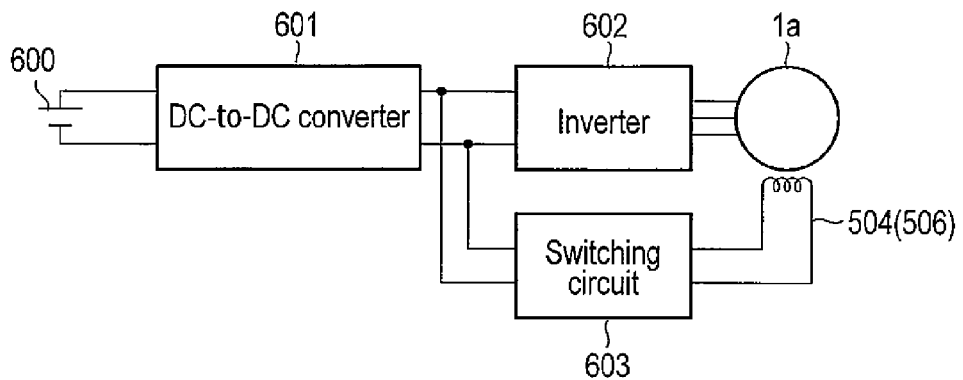
F I G. 4A
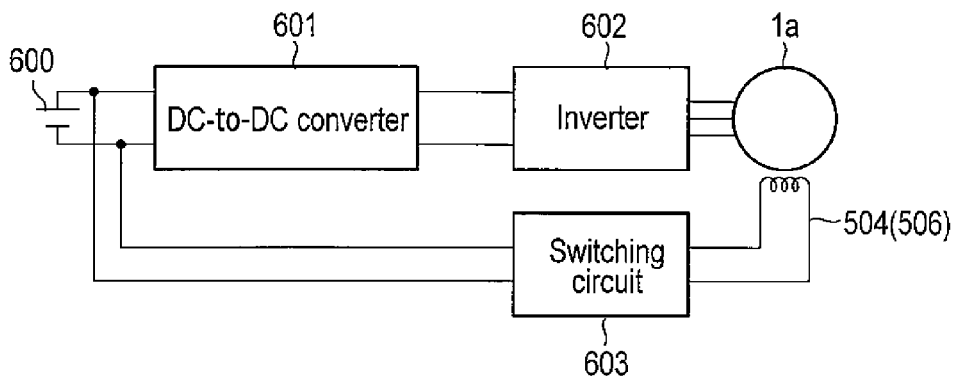
F I G. 4B
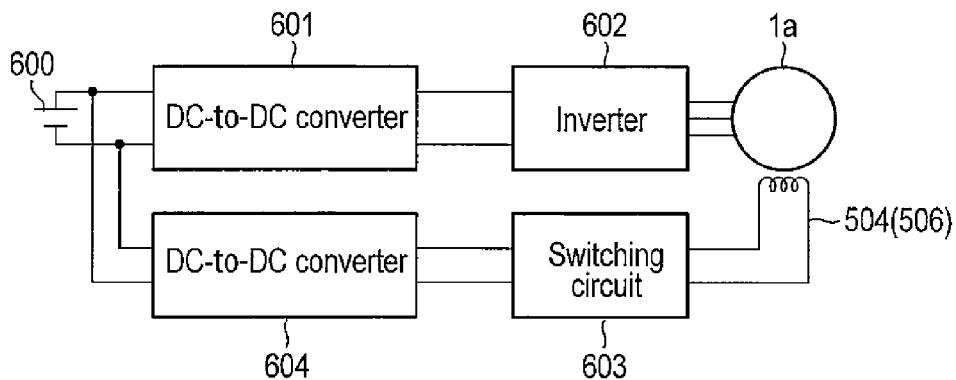
F I G. 4C

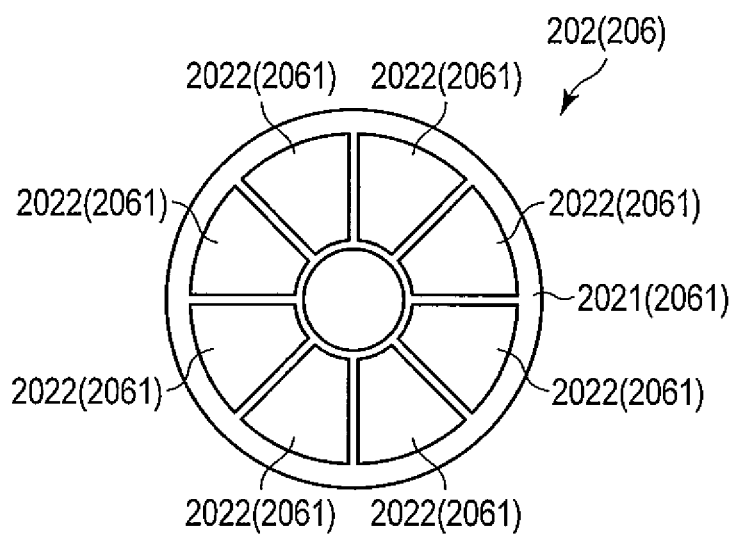
F I G. 7
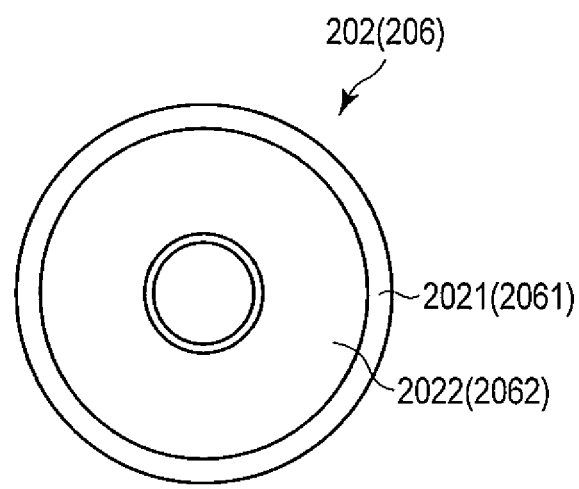
F I G. 8

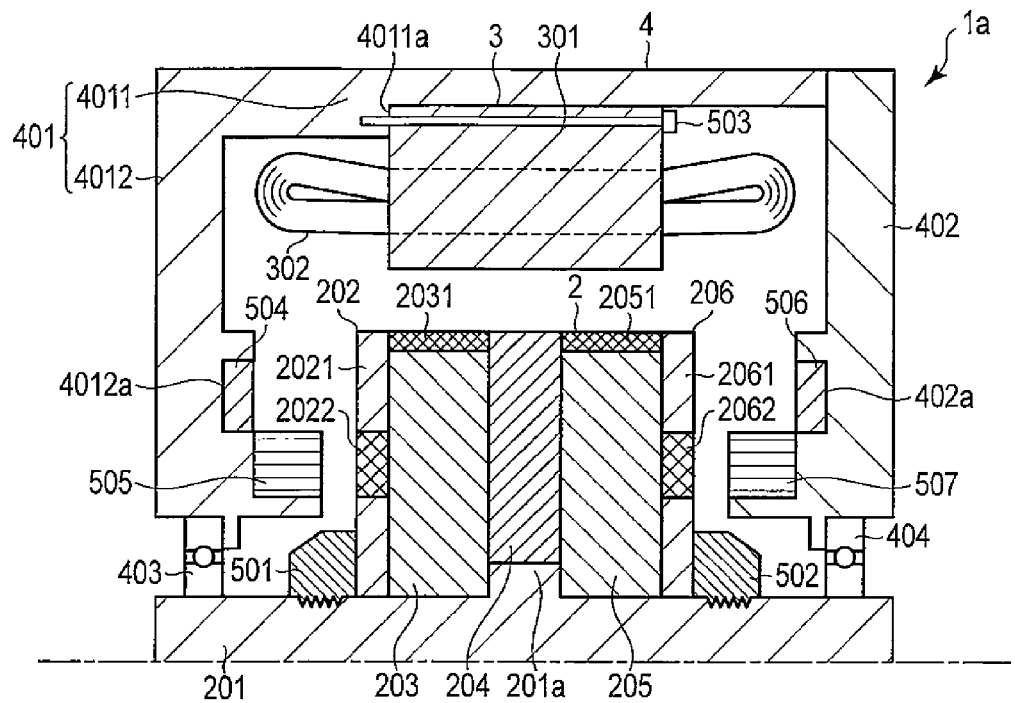
F I G. 9
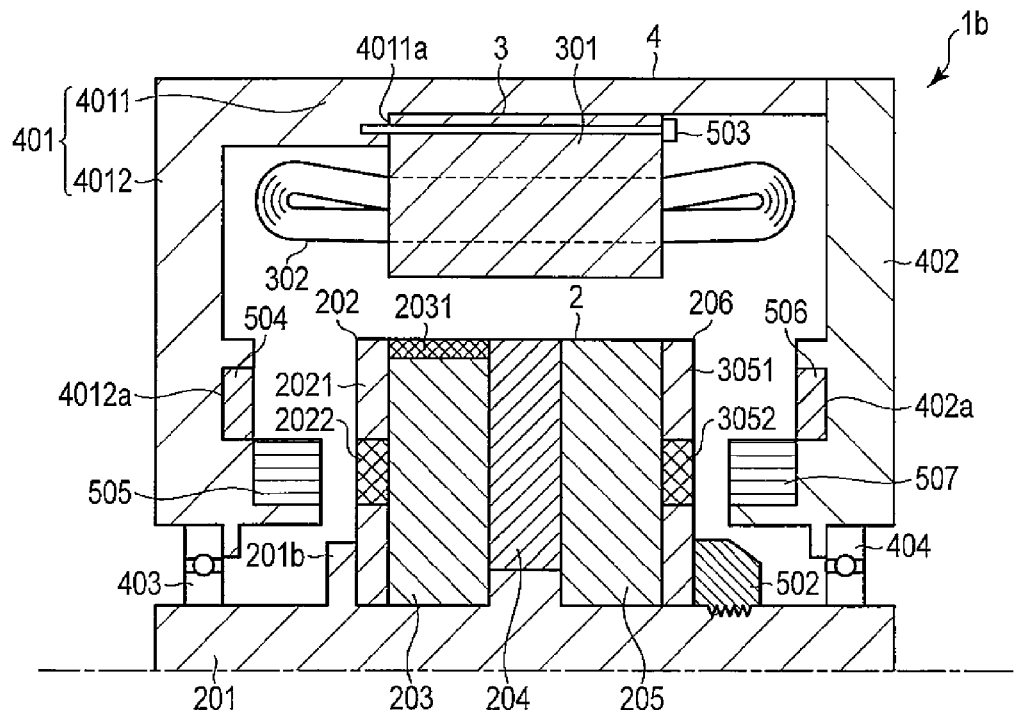
F I G. 10

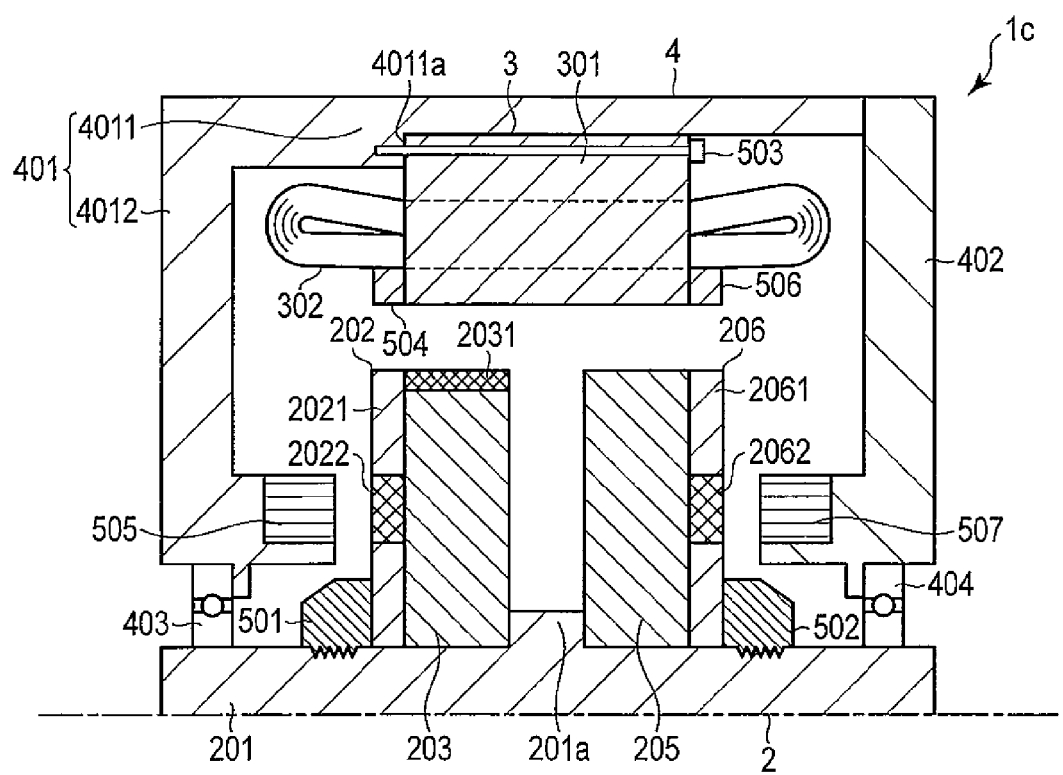
F I G. 11

PERMANENT-MAGNET TYPE ELECTRIC ROTATING MACHINE

CROSS-REFERENCE TO RELATED APPLICATIONS

This application is based upon and claims the benefit of priority from prior Japanese Patent Application No. 2011-038860, filed Feb. 24, 2011, the entire contents of which are incorporated herein by reference.

FIELD

Embodiments described herein relate generally to a permanent-magnet type electric rotating machine.

BACKGROUND

Carbon dioxide and energy consumption are increasing all over the world, in not only in the developed countries, but also the developing counties. The energy saving in various systems is effective in reducing the worldwide energy consumption. In electric cars, electric trains, elevators and household electrical appliances, for example, permanent magnets are used to acquire high efficiency. The electric car, for example, needs to drive (operate or run) in various modes, ranging a low-speed, high-torque mode to a high-speed, low-torque mode. In a medium- or high-speed mode, the permanent-magnet motor of the car inevitably works at a low efficiency while the car is driving at a low speed, a high speed or a light load. In view of this, attention is now paid to variable magnetomotive force motors, such as variable magnetomotive force memory motor, magnetic-field coil motor and winding-switching motor, in which the magnetic force of each permanent magnet can be directly changed in accordance with the driving condition.

In the variable magnetomotive force memory motor, the rotor holds constant magnetized magnets that do not change in magnetic force or magnetization (magnetizing) direction, and variable magnetized magnets that change in magnetic force or magnetization direction. The magnets of the two types cooperate, generating a magnetic field. If the magnetic force of the variable magnetized magnets greatly changes, the linkage flux at the armature coil will change due to all magnets used. The magnetic force and magnetization direction in the rotor are changed by the magnetic field generated by the magnetizing coil arranged around the stator as magnetizing pulse current flows in the magnetizing coil for an extremely short time.

The magnetizing coil, if arranged around the stator, must be clamped in the stator core. The stator is therefore longer than otherwise in its axial direction, by the size of the magnetizing coil. Consequently, the permanent-magnet type electric rotating machine is massive, and its assembling is complex.

An object of this invention is to provide a permanent-magnet type electric rotating machine that can be easily assembled with no need to increase the size.

BRIEF DESCRIPTION OF THE DRAWINGS

FIG. 3 is exemplary sectional views of rotor cores, as viewed in the axial direction of the electric rotating machine;

FIG. 4A is an exemplary block diagram of a control system for use in the permanent-magnet type electric rotating machine according to the first embodiment;

FIG. 4B is an exemplary block diagram of another type of a control system for use in the permanent-magnet type electric rotating machine according to the first embodiment;

FIG. 4C is an exemplary block diagram of still another type of a control system for use in the permanent-magnet type electric rotating machine according to the first embodiment;

FIG. 7 is an exemplary schematic diagram showing the configuration of a different end plate according to the first embodiment;

FIG. 8 is an exemplary schematic diagram showing the configuration of another different end plate according to the first embodiment;

FIG. 9 is an exemplary vertical sectional view showing a modification of the permanent-magnet type electric rotating machine according to the first embodiment;

FIG. 10 is an exemplary vertical sectional view of a permanent-magnet type electric rotating machine according to a second embodiment; and FIG. 11 is an exemplary vertical sectional view of a permanent-magnet type electric rotating machine according to a third embodiment.

DETAILED DESCRIPTION

In general, according to one embodiment, a permanent-magnet type electric rotating machine has a stator, a magnetizing coil, a rotor and a case. The stator has an armature coil configured to form a magnetic circuit for driving. The magnetizing coil is configured to form a magnetic circuit for magnetizing. The rotor has a constant magnetized magnet, a rotor core and a variable magnetized magnet. The rotor core holds the constant magnetized magnet. The constant magnetized magnet is arranged closer to the magnetic circuit for driving than the variable magnetized magnet. The variable magnetized magnet is arranged closer to the magnetic circuit for magnetizing than the constant magnetized magnet. The case holds the stator and the rotor.

Various embodiments will be described hereinafter with reference to the accompanying drawings. The components of each embodiment, which are identical to those of any other embodiment are designated by the same reference numbers, and will not be described repeatedly. The figures are schematic, each showing components in size and size ratio, both different from the actual values. The sizes and size ratio of the components can be changed, as needed, in accordance with the following description and the prior art.

Figure 1:
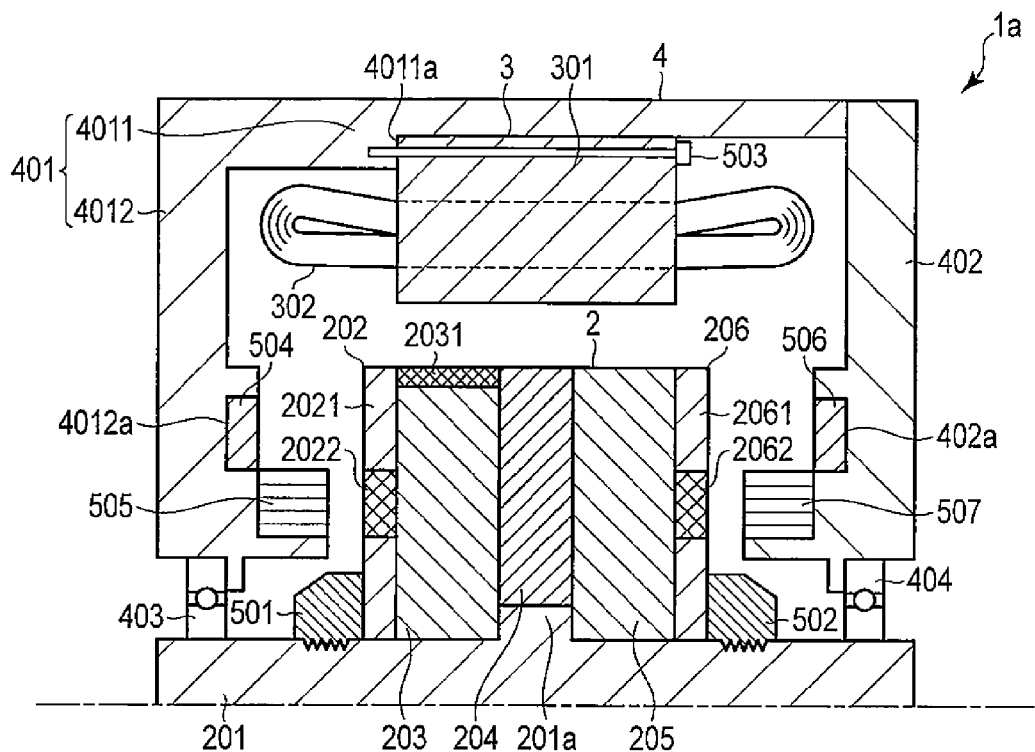
FIG. 1 is an exemplary vertical sectional view of a permanent-magnet type electric rotating machine of according to a first embodiment.

FIG. 1 is a sectional view of a permanent-magnet type electric rotating machine 1a according to a first embodiment, taken along a line perpendicular to the axis of the permanent-magnet type electric rotating machine 1a. The permanent-magnet type electric rotating machine 1a has a rotor 2, a stator 3, and a case 4. In the first embodiment, the direction orthogonal to the axis is called "diametrical direction."

The rotor 2 has a shaft 201, an end plate 202, a rotor core 203, a backing plate 204, a rotor core 205, and an end plate 206. The rotor 2 faces the stator 3 across an air-gap. The end plate 202, rotor core 203, backing plate 204, rotor core 205 and end plate 206 have a hole each, in which the shaft 201 is fitted. The end plate 202, rotor core 203, backing plate 204 and end plate 205 of the rotor 2 are mounted (provided) on the shaft 201, one after another in the order mentioned. To be more specific, the rotor 2 has its end plate 202 (i.e., variable magnetized magnet 2022 described later) and its end plate 206 (i.e., variable magnetized magnets 2062 described later) located on the more axial-end side than the rotor cores 203 and 205.

The shaft 201 is shaped like a pillar, having an outside diameter uniform in the axial direction. The shaft 201 has a projecting part 201a provided at a middle part as viewed in the axial direction and extending in the circumferential direction. The projecting part 201a contributes to the positioning of the rotor cores 203 and 205 and to the assembling of the rotor 2. How the rotor 2 is assembled will be described later. The shaft 201 is made of, for example, iron. The shaft 201 constitutes a part of the magnetic path.

The end plate 202 is large enough to exert a pressure to the entire contact surface of the rotor core 203. The end plate 202 is, for example, about 10 mm thick as measured in the axial direction. The configuration of the end plate 202 will be described later.

The rotor core 203 has been produced by laminating plates of magnetic steel made of by adding silicon to iron. The magnetic steel plates are ring-shaped plates having thickness of, for example, about 0.3 mm. The rotor core 203 is therefore shaped like a hollow cylinder. The rotor core 203 is mounted on the shaft 201, with one end contacting the projecting part 201a. The rotor core 203 holds a plurality of constant magnetized magnets 2031. "Constant magnetized magnet" is a permanent magnet exerting a magnetic force that does not change while the permanent-magnet type electric rotating machine 1a is driving. The constant magnetized magnets 2031 are, for example, rare-earth permanent magnets (e.g., NdFeB-based magnets) that have high coercivity. How the constant magnetized magnets 2031 are arranged in the rotor core 203 will be described later.

The backing plate 204 has a width almost equal to that of the projecting part 201a. The backing plate 204 is arranged, facing the projecting part 201a in the diametrical direction. Clamped by the rotor cores 203 and 205 at both sides in the axial direction, the backing plate 204 is secured to the shaft 201. The backing plate 204 prevents the rotor cores 203 and 205 from deforming as they are pressed by the end plates 202 and 206, respectively. The backing plate 204 is made of nonmagnetic material (e.g., aluminum) and functions as spacer, magnetically interrupting (isolating) the rotor cores 203 and 205 from each other. That is, the backing plate 204 prevents the rotor cores 203 and 205 from contacting each other.

The rotor core 205 is configured in the same manner as the rotor core 203. The rotor core 205 is mounted on the shaft 201, with one end contacting the projecting part 201a. The rotor core 205 holds a plurality of constant magnetized magnets 2051. How the constant magnetized magnets 2051 are arranged in the rotor core 205 will be described later.

The end plate 206 is large enough to exert a pressure to the entire contact surface of the rotor core 205. The end plate 206 is, for example, about 10 mm thick as measured in the axial direction.

Figure 2:
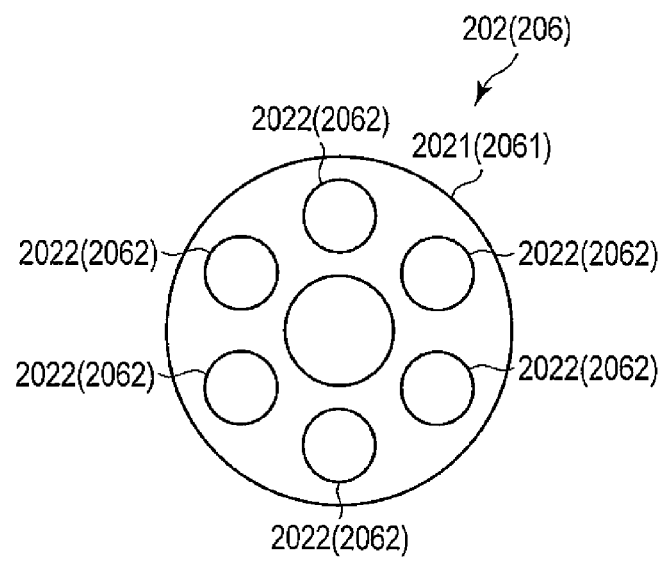
FIG. 2 is an exemplary schematic diagram showing the configuration of end plates according to the first embodiment.

FIG. 2 is a schematic diagram showing an exemplary of the end plates 202 and 206. The end plate 202 has a frame 2021 and a plurality of variable magnetized magnets 2022. Similarly, the end plate 206 has a frame 2061 and a plurality of variable magnetized magnets 2062. The frame 2021 and the frame 2061 are made of, for example, aluminum. The variable magnetized magnets 2022 are arranged on the frame 2021, in the circumferential direction of the end plate 202. The variable magnetized magnets 2022 are arranged in the frame 2021 and spaced apart equidistantly one from another. The variable magnetized magnets used in the first embodiment are permanent magnets, each having a magnetized state (i.e., value and direction of magnetic force) that changes with the magnetic field. The variable magnetized magnets have coercivity of, for example, about 100 to 500 kA/m, which is lower than that of constant magnetized magnets. The variable magnetized magnets 2022 are, for example, samarium-cobalt magnets. On the frame 2021, the variable magnetized magnets 2022 are arranged, with the easy direction of the magnetization aligned with the axial direction of the electric rotating machine 1a. The same hold true of the end plate 206. The frame 2021 and the frame 2061 do not face the variable magnetized magnets 2022 and the variable magnetized magnets 2062, respectively, not interfering with the magnetic paths of the variable magnetized magnets 2022 and with the magnetic paths of the variable magnetized magnets 2062. This prevents the performance of the permanent-magnet type electric rotating machine 1a from decreasing, unlike in the case where the frame 2021 and the frame 2061 interfere with the magnetic paths of the variable magnetized magnets 2022 and with the magnetic paths of the variable magnetized magnets 2062.

The securing of the end plate 202, rotor core 203, backing plate 204, rotor core 205 and end plate 206 to the shaft 201 will be explained.

The end plate 202 is mounted on the shaft 201 in such a manner that the rotor core 203 is clamped by the end plate 202 and the backing plate 204 in the axial direction. The end plate 202 is held secured by means of a nut 501 at the side opposite to the side which is in contact with the rotor core 203. The nut 501 is used, causing the end plate 202 to generate a force pushing the rotor core 203 to the backing plate 204 and projecting part 201a. Further, the nut 501 can easily secure the end plate 202 and the rotor core 203 to the shaft 201. Pushed by the nut 501, the end plate 202 pushes the rotor core 203 onto the backing plate 204 and projecting part 201a. The nut 501 has such an outside that it does not face the variable magnetized magnets 2022 fitted in the end plate 202. This prevents the performance of the permanent-magnet type electric rotating machine 1a from decreasing, unlike in the case where the nut 501 interferes with the magnetic paths of the variable magnetized magnets 2022.

On the other hand, the end plate 206 is mounted on the shaft 201 in such a manner that the rotor core 205 is clamped by the end plate 206 and the backing plate 204 in the axial direction. The end plate 206 is held secured by means of a nut 502 at the side opposite to the side which is in contact with the rotor core 205. The nut 502 is used, causing the end plate 202 to generate a force pushing the rotor core 205 to the backing plate 204 and projecting part 201a. The nut 502 causes the end plate 206 to generate a force pushing the rotor core 205 to the backing plate 204 and projecting part 201a. Further, the nut 502 can easily secure the end plate 206 and the rotor core 205 to the shaft 201. Pushed by the nut 502, the end plate 206 pushes the rotor core 205 onto the backing plate 204 and projecting part 201a. The nut 502 has such an outside that it does not face the variable magnetized magnets 2062 fitted in the end plate 206. This prevents the performance of the permanent-magnet type electric rotating machine 1a from decreasing, unlike in the case where the nut 502 interferes with the magnetic paths of the variable magnetized magnets 2062.

The stator 3 has a stator core 301 and an armature coil 302. The stator 3 is provided in the case 4 and arranged coaxial (concentric) with the rotor 2.

The stator core 301 has been produced by laminating plates of magnetic steel made of by adding silicon to iron. The stator core 301 extends in the axial direction for such a distance that it faces both rotor cores 203 and 205. The stator core 301 has a plurality of slots that extend in the axial directions.

The armature coil 302 has U-phase, V-phase and W-phase, provided in the stator core 301 and in the order mentioned. The ends of the armature coil 302 project, respectively from the end faces of the stator core 301, which are spaced apart in the axial direction. The armature coil 302 is configured to form a magnetic circuit for driving.

The case 4 is closed at both ends. The case 4 holds (incorporates) the rotor 2 and the stator 3. The case 4 is made of magnetic material (e.g., iron). The case 4 constitutes a part of the magnetic path. The case 4 has a case body 401, a cover 402, and bearings 403 and 404.

The case body 401 has a hollow cylindrical part 4011 and a circular (annular) part 4012. The cylindrical part 4011 is coaxial with the permanent-magnet type electric rotating machine 1a. The circular part 4012 closes one end (left end, in FIG. 1) of the cylindrical part 4011. The case body 401 opens at the other end (right end, in FIG. 1). The other end of the case body 401 is closed with the cover 402 which is described later. The circular part 4012 of the case body 401 has an opening in the center. The bearing 403 is fitted in the opening. The bearing 403 holds one end of the shaft 201, yet allowing the shaft 201 to rotate.

The cylindrical part 4011 has a stepped part 4011a, which is aligned, in the diametrical direction, with the interface between the end plate 202 and the rotor core 203. The stepped part 4011a extends along the circumference of the cylindrical part 4011. The cylindrical part 4011 is so designed that the inside diameter measured from the stepped part 4011a to one end (near the side of circular part 4012) is smaller than the inside diameter measured from the stepped part 4011a to the other end (near the cover 402). The stator 3 is fitted, contacting the stepped part 4011a in the axial direction. Therefore, the stator 3 is secured to the case body 401, facing the rotor 2 in the diametrical direction. The stepped part 4011a positions the stator 3 with respect to the case body 401. The stator 3 has an outside diameter almost equal to the inside diameter measured from the stepped part 4011a to the other end (near the cover 402). The stator 3 is secured to the case body 401 with, for example, screws 503. Alternatively, the stator 3 may be secured to the case body 401 by means of shrink fitting, without using screws 503. The method of securing the stator 3 to the case body 401 is not limited.

The circular part 4012 has a groove 4012a cut in the inner surface (facing the end plate 202) and extending in the circumferential direction of the case body 401. The groove 4012a is therefore positioned at that part of the circular part 4012, which faces the end plate 202.

In the groove 4012a, a magnetizing coil 504 is fitted. The magnetizing coil 504 is an annular member. The magnetizing coil 504 has the function of generating a magnetic field if it is excited with a DC current. This magnetic field magnetizes the variable magnetized magnets 2022. The magnetizing coil 504 is configured to form a magnetic circuit for magnetizing.

Further, a laminate core 505, which is an annular member and is wound coaxial with the shaft 201, is attached to the circular part 4012. The laminate core 505 is arranged, facing the variable magnetized magnets 2022 in the axial direction. The laminate core 505 has the function of preventing an eddy current from flowing in the circular part 4012 that faces the variable magnetized magnets 2022 in the axial direction. The case body 401, which holds the magnetizing coil 504 and laminate core 505, is impregnated with resin.

The cover 402 is an annular member, having an opening in the center. The bearing 404 is fitted in this opening. The bearing 404 holds the other end of the shaft 201, yet allowing the shaft 201 to rotate. The cover 402 is secured to the case body 401, and closes the other end of the case body 401. The cover 402 is secured to the case body 401 with, for example, screws. The method of securing the cover 402 to the case body 401 is not limited, nonetheless. The cover 402 has an annular groove 402a in the inner surface (i.e., surface facing the end plate 206). So made in the cover 402, the annular groove 402a is positioned, facing the end plate 206.

In the groove 402a, a magnetizing coil 506 is fitted. The magnetizing coil 506 is an annular member. The magnetizing coil 506 has the function of generating a magnetic field if it is excited with a DC current. This magnetic field magnetizes the variable magnetized magnets 2062. The magnetizing coil 506 is configured to form a magnetic circuit for magnetizing.

Further, a laminate core 507 which is an annular member and is wound coaxial with the shaft 201, is attached to the cover 402. The laminate core 507 is arranged, facing the variable magnetized magnets 2062 in the axial direction. Like the laminate core 505, the laminate core 507 has the function of preventing an eddy current from flowing in the cover 402 that faces the variable magnetized magnets 2062 in the axial direction. The cover 402, which holds the magnetizing coil 506 and laminate core 507, is impregnated with resin.

FIG. 3 is sectional views of rotor cores 203 and 205, as viewed in the axial direction of the permanent-magnet type electric rotating machine 1a. More precisely, FIG. 3 shows the positional relation of the rotor cores 203 and 205, both secured to the shaft 201. The rotor core 203 has recesses 203a and projections 203b, which are alternately and equidistantly arranged in the circumferential direction of the rotor core 203. The rotor core 203 has, for example, four recesses 203a and four projections 203b. Therefore, the recesses 203a are spaced apart, one from the next one by 90°, and the projections 203b spaced apart, one from the next one by 90°. In each recess 203a, one constant magnetized magnet 2031 is fitted (embedded or arranged). The air-gap face of every constant magnetized magnet 2031 is an N pole.

The rotor core 205 has recesses 205a and projections 205b, which are alternately and equidistantly arranged in the circumferential direction of the rotor core 205. The rotor core 205 has, for example, four recesses 205a and four projections 205b. Therefore, the recesses 205a are spaced apart, one from the next one by 90°, and the projections 205b spaced apart, one from the next one by 90°. In each recess 205a, one constant magnetized magnet 2051 is fitted (embedded or arranged). The air-gap face of every constant magnetized magnet 2051 is an S pole. The projections 205b of the rotor core 205 face the constant magnetized magnets 2031 of the rotor core 203, respectively, in the axial direction. In other words, the constant magnetized magnet 2051 of the rotor core 205 faces the projections 203b of the rotor core 203, respectively, in the axial direction. That is, the rotor core 203 and the rotor core 205 are mounted on the shaft 201, displaced from each other by one-pole circumferential distance (i.e., 45°).

As can be understood from the above, in one example of the first embodiment, the rotor 2 has the constant magnetized magnets 2031 and 2051 and the variable magnetized magnets 2022 and 2062. The constant magnetized magnets 2031 and 2051 are arranged closer to the magnetic circuit for driving formed by the armature coil 302 than the variable magnetized magnets 2022 and 2062, respectively. For example, the constant magnetized magnets 2031 and 2051 are closer to the armature coil 302 than the variable magnetized magnets 2022 and 2062, respectively, in the diametrical direction. The variable magnetized magnets 2022 are arranged closer to the magnetic circuit for magnetizing formed by magnetizing coil 504 than the constant magnetized magnets 2031. The variable magnetized magnets 2062 are arranged closer to the magnetic circuit for magnetizing formed by magnetizing coil 506 than the constant magnetized magnets 2061. For example, the variable magnetized magnets 2022 are closer to the magnetizing coil 504 than the constant magnetized magnets 2031, in the axial direction. The variable magnetized magnets 2062 are closer to the magnetizing coil 506 than the constant magnetized magnets 2051, in the axial direction. It should be noted that the permanent-magnet type electric rotating machine 1a may comprise only one magnetization coil.

A sequence of assembling the permanent-magnet type electric rotating machine 1a according to the first embodiment will be explained. The sequence described below is no more than an example, and can be changed, thereby to modify the permanent-magnet type electric rotating machine 1a.First, the magnetizing coil 504 and laminate core 505 are fitted in the case body 401, and the case body 401 is then impregnated with resin. Similarly, the magnetizing coil 506 and laminate core 507 are fitted in the cover 402, and the cover 402 is then impregnated with resin. Next, the stator 3 is fitted in the case body 401 and then secured to the case body 401 with the screws 503.

Next, the rotor 2 is assembled as will be described below. First, the backing plate 204 is mounted on the shaft 201. Then, the rotor core 203 and the rotor core 205 are mounted on the shaft 201, from the ends of the shaft 201, respectively. Note that the rotor core 203 and the rotor core 205 are secured to the shaft 201, assuming such a positional relation as shown in FIG. 3. Then, the end plates 202 and 206 are mounted on the shaft 201, from the ends of the shaft 201, respectively. The nut 501 is tightened, pushing the end plate 202, whereby the rotor core 203 is secured to the shaft 201. Similarly, nut 502 is tightened, pushing the end plate 206, whereby the stator core 205 is secured to the shaft 201.

Next, one end of the shaft 201 is inserted into the bearing 403. Then, the cover 402 is coupled to the case body 401, while the other end of the shaft 201 is being inserted into the bearing 404.

The control system of the permanent-magnet type electric rotating machine 1a according to the first embodiment will be described. FIG. 4A is a block diagram of the control system used in the permanent-magnet type electric rotating machine 1a according to the first embodiment. The control system of FIG. 4A has a battery 600, a DC-to-DC converter 601, an inverter 602, and a switching circuit 603.

The DC-to-DC converter 601 converts the DC voltage of the battery 600 to a different DC voltage, thus functioning as a booster circuit. The DC-to-DC converter 601 is connected to the inverter 602.

The inverter 602 is supplied with the DC current output from the DC-to-DC converter 601. The inverter 602 converts the DC current supplied from the DC-to-DC converter 601, to three-phase AC power. The inverter 602 is connected to the armature coil 302, and supplies the three-phase AC power to the U-phase, V-phase and W-phase at the armature coil 302.

The switching circuit 603 is connected, at one end, to the output of the DC-to-DC converter 601 (in other words, to the DC-power supply side of the inverter 602). That is, the switching circuit 603 receives the DC voltage generated by the DC-to-DC converter 601. The switching circuit 603 is connected, at the other end, to the magnetizing coils 504 and 506. The switching circuit 603 supplies a pulsative DC voltage to the magnetizing coils 504 and 506, exciting the magnetizing coils 504 and 506. The switching circuit 603 is controlled to excite the magnetizing coils 504 and 506 temporarily, in order to change the magnetized state of the variable magnetized magnets 2022 and 2062. The DC voltage for exciting the magnetizing coils 504 and 506 has been boosted in the DC-to-DC converter 601.

FIG. 4B shows a modified control system for use in the permanent-magnet type electric rotating machine 1a according to the first embodiment. The system shown in FIG. 4B has a battery 600, a DC-to-DC converter 601, an inverter 602, and a switching circuit 603. Unlike in the control system of FIG. 4A, the switching circuit 603 is connected, at one end, to the battery 600, and at the other end, to the magnetizing coils 504 and 506.

The control systems shown in FIG. 4A and FIG. 4B do not have a complicated configuration for exciting the magnetizing coils 504 and 506. The DC-to-DC converter 601 can therefore apply both a voltage for drive control and a voltage for excitation control. Thus, these control systems are simple in configuration, having only the switching circuit 603, in addition to the DC-to-DC converter 601 and inverter 602 functioning as driving components in the permanent-magnet type electric rotating machine 1a.

FIG. 4C shows another modified control system for use in the permanent-magnet type electric rotating machine 1a according to the first embodiment. The control system of FIG. 4C has a DC-to-DC converter 604, in addition to a battery 600, a DC-to-DC converter 601, an inverter 602 and a switching circuit 603.

Like the DC-to-DC converter 601, the DC-to-DC converter 604 converts the DC voltage of the battery 600 to a DC voltage of a prescribed value. The DC-to-DC converter 601 functions as a booster circuit. The switching circuit 603 is connected, at one end, to the output of the DC-to-DC converter 604. The switching circuit 603 is connected, at the other end, to the magnetizing coils 504 and 506.

The control system shown in FIG. 4C has one more component i.e., DC-to-DC converter 604, than the control systems shown in FIG. 4A or FIG. 4B. However, it can be smaller than the controls systems shown in FIG. 4A and FIG. 4B, for the following reason. The control systems of FIG. 4A and FIG. 4B, in which the DC-to-DC converter 601 serves to control both driving and excitation, may not enable the permanent-magnet type electric rotating machine 1a to operate to its maximum capacity. Further, in the control systems of FIG. 4A and FIG. 4B, the DC-to-DC converter 601 must be large enough to prevent heat generation while both the drive control and the excitation control are undergoing. By contrast, in the control system of FIG. 4C, the DC-to-DC converter 604 is a component independent of the DC-to-DC converter 601 for achieving the drive control, and need not have a complicated configuration to excite the magnetizing coils 504 and 506. The DC-to-DC converter 604 therefore need not be large to prevent heat generation. Hence, the control system of FIG. 4C can be made small as a whole even if it comprises an increased number of structural elements. Moreover, the control system of FIG. 4C enables the permanent-magnet type electric rotating machine 1a to operate to its maximum capacity, because the DC-to-DC converter 601 is a component operating independently of the DC-to-DC converter 604 used to excite the magnetizing coils 504 and 506.

Figure 5:
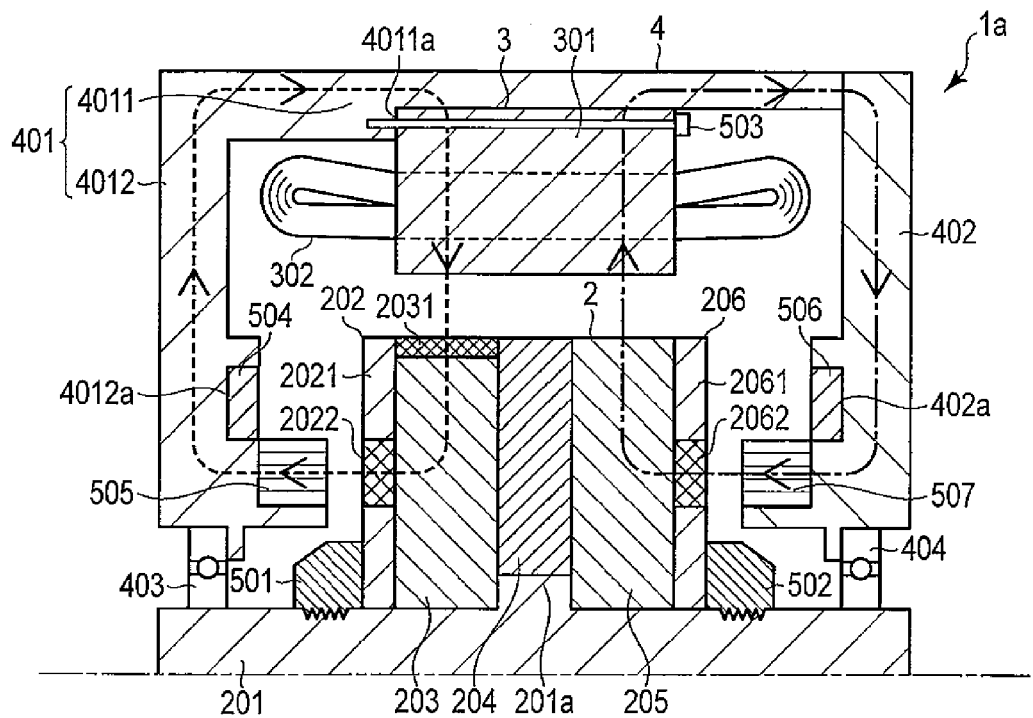
FIG. 5 is an exemplary diagram showing magnetic fluxes in the permanent-magnet type electric rotating machine according to the first embodiment.
Figure 6:
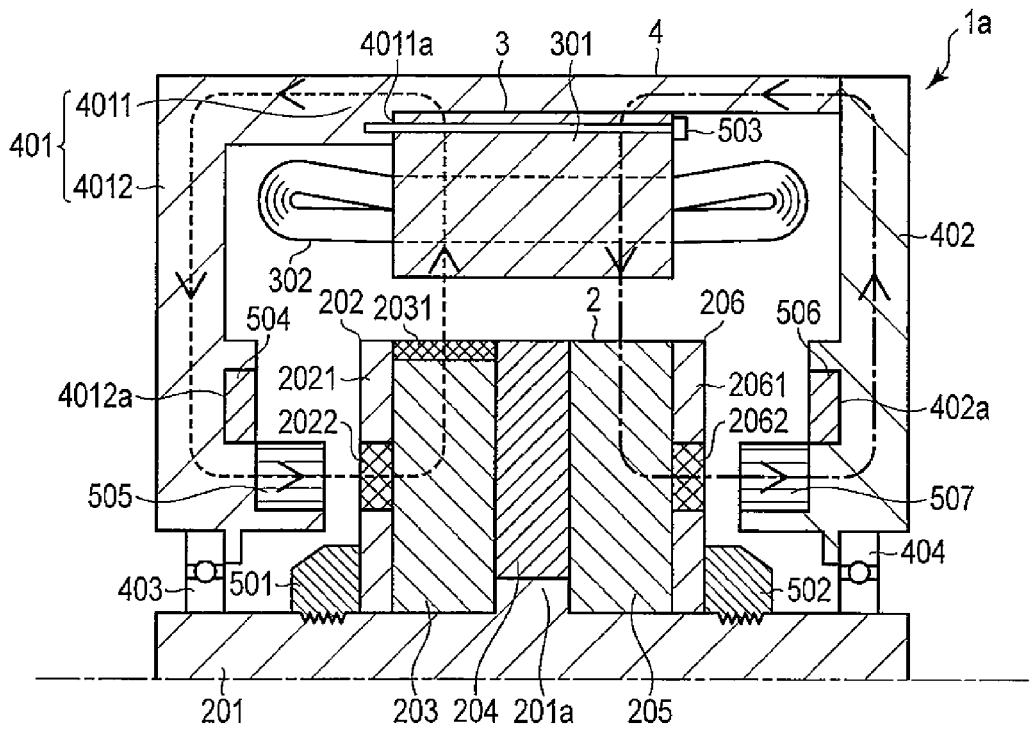
FIG. 6 is an exemplary diagram showing different magnetic fluxes in the permanent-magnet type electric rotating machine according to the first embodiment.

How the permanent-magnet type electric rotating machine 1a according to the first embodiment operates will be explained with reference to FIG. 5 and FIG. 6. FIG. 5 and FIG. 6 are vertical sectional views of the machine 1a according to the first embodiment. First, it will be explained how the linkage flux increases at the armature coil 302.

FIG. 5 shows how the magnetizing coil 504 and variable magnetized magnets 2022 generate magnetic fluxes (indicated by broken-line arrows) and how the magnetizing coil 506 and variable magnetized magnets 2062 generate magnetic fluxes (indicated by one-dot, chain-line arrows), in order to maximize the linkage flux at the armature coil 302. The magnetizing coil 504 temporarily generates magnetic fluxes (magnetic field) extending in a direction of the broken-line arrows, magnetizing the variable magnetized magnets 2022, thereby to make the variable magnetized magnets 2022 magnetize the rotor core 203 to S polarity. When magnetized with the magnetic fluxes (magnetic field) generated by the magnetizing coil 504, the variable magnetized magnets 2022 generate magnetic fluxes (magnetic field) extending in the direction of the broken-line arrows. As a result, S poles at the projections 203b and N poles at the constant magnetized magnet 2031 are alternately formed in the circumferential direction, in the air-gap face of the rotor core 203.

Meanwhile, the magnetizing coil 506 temporarily generates magnetic fluxes (magnetic field) extending in the direction of a one-dot, chain-line arrows, magnetizing the variable magnetized magnets 2062, thereby to make the variable magnetized magnets 2062 magnetize the rotor core 205 to N polarity. When magnetized with the magnetic fluxes (magnetic field) generated by the magnetizing coil 506, the variable magnetized magnets 2062 generate magnetic fluxes (magnetic field) extending in the direction of the one-dot, chain-line arrows. As a result, S poles at the projections 205b and N poles at the constant magnetized magnet 2051 are alternately formed in the circumferential direction, in the air-gap face of the rotor core 205. That is, the rotor core 203 and the stator core 205, which are spaced apart in the axial direction, assume the same polarity in the circumferential direction.

The linkage flux at the armature coil 302 increases because the magnetic fluxes emanating from the rotor core 203 and the rotor core 205 extend in the same direction. The permanent-magnet type electric rotating machine 1a therefore has its torque increased. Further, while the permanent-magnet type electric rotating machine 1 is driving at low speed, the switching circuit 603 may keep supplying a current to the magnetizing coils 504 and 506 so that the magnetic fluxes generated by the coils 504 and 506 may increase the linkage flux at the armature coil 302 to a maximum value, ultimately to increase the torque for a short time. In this case, the torque of the permanent-magnet type electric rotating machine 1a is maximized as in the case where the largest allowable current flows in the magnetizing coils 504 and 506, when any electric train or electric car having the permanent-magnet type electric rotating machine 1a starts running at a maximum load, climbs a hill or goes over an obstacle and maximum torque is required.

How to decrease the linkage flux at the armature coil 302 will be explained below.

FIG. 6 shows how the magnetizing coil 504 and variable magnetized magnets 2022 generate magnetic fluxes (indicated by broken-line arrows) and how the magnetizing coil 506 and variable magnetized magnets 2062 generate magnetic fluxes (indicated by one-dot, chain-line arrows), in order to minimize the linkage flux at the armature coil 302. The magnetizing coil 504 temporarily generates magnetic fluxes (magnetic field) extending in a direction of the broken-line arrows, magnetizing the variable magnetized magnets 2022, thereby to make the variable magnetized magnets 2022 magnetize the rotor core 203 to N polarity. When magnetized with the magnetic fluxes (magnetic field) generated by the magnetizing coil 504, the variable magnetized magnets 2022 generate magnetic fluxes (magnetic field) extending in the direction of the broken-line arrows. The air-gap face of the rotor core 203 therefore assumes, in the circumferential direction, the same polarity (i.e., N polarity) as the polarity (i.e., N polarity) of the projections 203b and constant magnetized magnet 2031.

Meanwhile, the magnetizing coil 506 temporarily generates magnetic fluxes (magnetic field) extending in the direction of the one-point, chain-line arrows, thereby to make the variable magnetized magnets 2062 magnetize the rotor core 205 to S polarity. When magnetized with the magnetic fluxes (magnetic field) generated by the magnetizing coil 506, the variable magnetized magnets 2062 generate magnetic fluxes (magnetic field) extending in the direction of the one-point, chain-line arrows. The air-gap face of the rotor core 205 therefore assumes, in the circumferential direction, the same polarity (i.e., S polarity) as the polarity (i.e., S polarity) of the projections 205b and constant magnetized magnet 2051. Thus, the rotor core 203 and the rotor core 205 assume different polarities in the circumferential direction. No torque is therefore generated in the permanent-magnet type electric rotating machine 1a.In other words, the linkage flux at the armature coil 302 decreases because the magnetic fluxes emanating from the rotor core 203 cancel out the magnetic fluxes emanating from the rotor core 205.

As a result, the voltage induced from the linkage flux at the armature coil 302 decreases to a minimum and becomes equal to or lower than the allowable voltage of the inverter 602, even if the permanent-magnet type electric rotating machine 1a is drived at a higher rotation speed. The rotation speed of the permanent-magnet type electric rotating machine 1a can therefore be raised. Moreover, in the high-speed region of the permanent-magnet type electric rotating machine 1a, the switching circuit 603 may excite the magnetizing coil 504 and 506 to cause the magnetic fluxes emanating from theses coils 504 and 506 to eliminate the linkage flux at the armature coil 302.

In the permanent-magnet type electric rotating machine 1a used in, for example, an electric train or electric car, a current is made to flow in the magnetizing coils 504 and 506 if the wheels or tires rotate, in idle, at high speed, thereby to decrease the linkage fluxes emanating from the variable magnetized magnets 2022 and 2062. Hence, the permanent-magnet type electric rotating machine 1a can drive at a still higher rotation speed.

A modification of the first embodiment will be described. The shaft 201 need not have the projecting part 201a. This is because, even if shaft 201 has no projecting parts, the backing plate 204 prevents the rotor cores 203 and 205 from deforming, while pushed by the end plates 202 and 206, respectively, and ultimately preventing the rotor cores 203 and 205 from contacting each other.

Further, in the case body 401, the magnetizing coil 504 need not be positioned to face the end plate 202 in the axial direction. The magnetizing coil 504 may be arranged in the case body 401, only to enable its magnetic fluxes to pass through the variable magnetized magnets 2022. Similarly, on the cover 402, the magnetizing coil 506 provided be positioned to face the end plate 206 in the axial direction. The magnetizing coil 506 may be arranged on the cover 402, only to enable its magnetic fluxes to pass through the variable magnetized magnets 2062.

Furthermore, the end plates 202 and 206 are not limited to the type shown in FIG. 2. Rather, they may be configured as shown in FIG. 7 or FIG. 8. The end plate 202 shown in FIG.

7 has a plurality of variable magnetized magnets 2022, which are arranged on the frame 2021, scarcely spaced from one another in the circumferential direction. The end plate 206 is similar to the end plate 202 in terms of configuration. The end plate 202 shown in FIG. 8 has one annular variable magnetized magnet 2022, which is arranged on the frame 2021. The end plate 206 is similar to the end plate 202 in terms of configuration. If the end plates 202 and 206 are configured as shown in FIG. 7 or FIG. 8, the laminate cores 505 and 507 need not be arranged on the inner surface of the case 4. This is because almost no eddy current flows in the case 4 since the magnetic fluxes do not change in intensity even if the rotor 2 rotates, at those parts of the case 4 which faces the variable magnetized magnets 2022 or 2062 as shown in FIG. 7 or FIG. 8.

Moreover, the rotor cores 203 and 205 may be mounted on the shaft 201 so that the constant magnetized magnets 2031 and 2051 face each other in the axial direction as shown in FIG. 9. Note that the air-gap face of the constant magnetized magnet 2031 may have the same polarity (S or N) as that of the air-gap face of the constant magnetized magnet 2051.

It will be explained how the linkage flux increases at the armature coil 302 in a permanent-magnet type electric rotating machine 1*a* having such a rotor 2 as shown in FIG. 9. The magnetizing coils 504 and 506 temporarily generate magnetic fluxes (magnetic fields) that magnetize, respectively the variable magnetized magnets 2022 and the variable magnetized magnets 2062, so that the projections 203*b* of the rotor core 203 and the projections 205*b* of the rotor core 205 may have the same polarity. Any part of the rotor core 203 and the associated part of the rotor core 205 have the same polarity in the circumferential direction. The magnetic fluxes emanating from the rotor cores 203 and 205 therefore extend in the same direction. As a result, the linkage flux increases at the armature coil 302.

It will be explained how the linkage flux decreases at the armature coil 302 in a permanent-magnet type electric rotating machine 1*a* having such a rotor 2 as shown in FIG. 9. The magnetizing coils 504 and 506 temporarily generate magnetic fluxes (magnetic fields) that magnetize, respectively the variable magnetized magnets 2022 and the variable magnetized magnets 2062, so that the projections 203*b* of the rotor core 203 and the projections 205*b* of the rotor core 205 may have different polarities. The magnetic fluxes emanating from the rotor cores 203 and 205 therefore cancel out each other. As a result, the linkage flux decreases at the armature coil 302.

According to the first embodiment, the permanent-magnet type electric rotating machine 1*a* directly changes the magnetic forces of the variable magnetized magnets 2022 and 2062 in accordance with a driving condition, in such a manner that various driving modes are enabled in a wide range, from a low-speed, high-torque mode to a high-speed, low-torque mode. Further, the permanent-magnet type electric rotating machine 1*a* according to the first embodiment can be easily assembled with no need to increase the size.

A second embodiment will be described with reference to FIG. 10. FIG. 10 is a vertical sectional view of a permanent-magnet type electric rotating machine 1*b* according to the second embodiment. In the second embodiment, the shaft 201 has a projecting part 201*b* extending in the circumferential direction. The projecting part 201*b* is provided a part close to the circular part 4012, not at a middle part as viewed in the axial direction. The projecting part 201*b* contacts the end plate 202. The end plate 206 is secured to the shaft 201, with a nut 502 as in the first embodiment. Thus, in the second embodiment, the end plate 202, rotor core 203, backing plate 204, rotor core 205 and end plate 206 are secured to the shaft 201, because they are clamped between the projecting part 201*b* and the nut 502 tightened at the other end of the shaft 201. The projecting part 201*b* is not so large to face the variable magnetized magnets 2022 fitted in the end plate 202. This prevents the performance of the permanent-magnet type electric rotating machine 1*b* from decreasing, unlike in the case where the projecting part 201*b* interferes with the magnetic paths of the variable magnetized magnets 2022. The projecting part 201*b* performs the same function as the nut 501 does in the first embodiment. Therefore, the second embodiment is composed of fewer components than the first embodiment, and the projecting part 201*b* secures the end plate 202, the rotor core 203, the backing plate 204, the rotor core 205, and the end plate 206 to the shaft 201 more firmly than in the first embodiment.

A sequence of assembling the permanent-magnet type electric rotating machine 1*b* according to the second embodiment will be explained. The sequence described below is no more than an example, and can be changed, thereby to modify the permanent-magnet type electric rotating machine 1*b*. First, the magnetizing coil 504 and laminate core 505 are fitted in the case body 401, and the case body 401 is then impregnated with resin. Similarly, the magnetizing coil 506 and laminate core 507 are fitted in the cover 402, and the cover 402 is then impregnated with resin.

Next, the stator 3 is fitted in the case body 401 and then secured to the case body 401 with the screws 503. Further, the end plate 202, the rotor core 203, the backing plate 204, the rotor core 205 and the end plate 206 are mounted on the shaft 201, one after another in the order mentioned. Then, the nut 502 is tightened, pushing the end plate 206, whereby the end plate 202, the rotor core 203, the backing plate 204, the rotor core 205 and the end plate 206 are secured to the shaft 201. Next, one end of the shaft 201 is inserted into the bearing 403. Then, the cover 402 is coupled to the case body 401, while the other end of the shaft 201 is being inserted into the bearing 404.

According to the second embodiment, the permanent-magnet type electric rotating machine 1*b* drives as in the first embodiment, and can be easily assembled with no need to increase the size.

A third embodiment will be described with reference to FIG. 11. FIG. 11 is a vertical sectional view of a permanent-magnet type electric rotating machine 1*c* according to a third embodiment. In the third embodiment, the magnetizing coils 504 and 506 are secured to the stator 3, not to the case 4 as in the first embodiment. Further, a backing plate 204 is not provided in the rotor 2.

At the stator core 301, the magnetizing coil 504 is positioned, facing the end plate 202 (or any variable magnetized magnet 2022) in the diametrical direction. Similarly, at the stator core 301, the magnetizing coil 506 is positioned, facing the end plate 206 (or any variable magnetized magnet 2062) in the diametrical direction. The positions the magnetizing coils 504 and 506 take at the stator core 301 are not limited to these. The magnetizing coil 504 may be arranged at the stator core 301, only to enable its magnetic fluxes (magnetic field) to pass through the variable magnetized magnet 2022. For example, the magnetizing coil 504 may be positioned at the stator core 301, facing the rotor core 203 in the diametrical direction. Similarly, the magnetizing coil 506 may be positioned at the stator core 301, facing the rotor core 205 in the diametrical direction. If the magnetizing coil 504 is arranged at the stator core 301 and near the armature coil 302, an insulating member such as a paper sheet may be interposed between the magnetizing coil 504 and the armature coil 302. This prevents direct contact between the magnetization coil 504 and the armature coil 302, thereby keeping the permanent-magnet type electric rotating machine 1c from deteriorating in performance. Similarly, an insulating member may be interposed between the magnetizing coil 506 and the armature coil 302.

Unlike the first embodiment, the third embodiment does not use a backing plate 204 in the rotor 2. The shaft 201 has a projecting part 201a as in the first embodiment. Like the backing plate 204, the projecting part 201a of the shaft 201 can prevent the rotor cores 203 and 205 from deforming when they are pushed by the end plates 202 and 206, respectively. Further, like the backing plate 204, the projecting part 201a of the shaft 201 provides a gap between the rotor cores 203 and 205, thus preventing them from contacting each other.

A sequence of assembling the permanent-magnet type electric rotating machine 1c according to the third embodiment will be explained. The sequence described below is no more than an example, and can be changed, thereby to modify the permanent-magnet type electric rotating machine 1c. First, the laminate core 505 is fitted in the case body 401, and the cover 402 is impregnated with resin. Similarly, the laminate core 507 is fitted in the cover 402, and the cover 402 is impregnated with resin.

Next, the magnetizing coils 504 and 506 arranged at the stator core 301, and the stator core 301 is impregnated with resin. Next, the stator 3 is fitted in the case body 401, and then secured to the case body 401 with the screws 503. Thus, the rotor 2 is assembled, not using a backing plate 204, as in the first embodiment. Next, one end of the shaft 201 is inserted into the bearing 403. Then, the cover 402 is coupled to the case body 401, while the other end of the shaft 201 is being inserted into the bearing 404.

According to the third embodiment, the permanent-magnet type electric rotating machine 1c drives as in the first embodiment, and can be easily assembled with no need to increase the size.

The components of any embodiment described above can be combined with those of any other embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A permanent-magnet type electric rotating machine comprising:
    a stator comprising an armature coil configured to form a magnetic circuit for driving;
    a magnetizing coil configured to form a magnetic circuit for magnetizing;
    a rotor comprising a constant magnetized magnet, a rotor core holding the constant magnetized magnet and a variable magnetized magnet, the constant magnetized magnet being arranged closer to the magnetic circuit for driving than the variable magnetized magnet, and the variable magnetized magnet being arranged closer to the magnetic circuit for magnetizing than the constant magnetized magnet; and
    a case holding the stator and the rotor.

2. The machine of claim 1, wherein the rotor has the variable magnetized magnet located on more axial-end side than the rotor core.

3. The machine of claim 1, wherein the magnetizing coil is arranged in the case.

4. The machine of claim 1, wherein the magnetizing coil is arranged on the stator.

5. The machine of claim 1, further comprising a laminate core arranged in the case and facing the variable magnetized magnet.

6. The machine of claim 1, wherein an electric current is made to flow continuously in the magnetizing coil, thereby to increase a torque for a short time.

* * * * *